United States Patent [19]

Mikina

[11] Patent Number: 4,603,881

[45] Date of Patent: Aug. 5, 1986

[54] VEHICLE SUSPENSION

[76] Inventor: Stanley J. Mikina, 4782 Coquina Key Dr. SE., St. Petersburg, Fla. 33705

[21] Appl. No.: 700,594

[22] Filed: Feb. 11, 1985

[51] Int. Cl.$^4$ .............................................. B62D 17/00
[52] U.S. Cl. .................................. 280/675; 280/689; 280/772
[58] Field of Search ........... 280/675, 772, 104, 112 R, 280/95 R, 703, 689

[56] References Cited

U.S. PATENT DOCUMENTS 4,373,743  2/1983  Parsons ............................... 280/675
4,515,390  5/1985  Greenberg ........................... 280/675

Primary Examiner—Richard A. Bertsch
Attorney, Agent, or Firm—William J. Ruano

[57] ABSTRACT

In a vehicle consisting of sprung and unsprung masses, rollout of the sprung mass away from the unsprung mass due to centrifugal force on the sprung mass in turns is eliminated and free independent movement of the wheels is permitted by pivoting the sprung mass at two locations on an axis passing through the center-of-gravity of the sprung mass and lying in a plane parallel to the centrifugal force vector. The centrifugal force acting on the center-of-gravity of the sprung mass has no overturning moment around this pivot axis. The resulting centrifugal force component on each axis pivot is transmitted to the wheels and ground without producing any rollout deflections of the main vehicle support springs. The anti-roll torsion bar is eliminated and softer body support springs may be used for improved isolation of road shocks and vibrations from the sprung mass.

6 Claims, 3 Drawing Figures

VEHICLE SUSPENSION

This invention relates to a vehicle suspension.

BACKGROUND OF INVENTION

In order to isolate the occupants or other contents of a vehicle from road shocks and vibrations, that part of the vehicle weight which consists of the vehicle body, frame and engine plus transmission, is supported on the axles and wheels on springs having a low rate or force/deflection characteristic. Such comparatively soft springs are particularly necessary on vehicles with high pressure radial tires whose own isolation function is greatly reduced by their high effective spring rate.

However, the use of soft vehicle support springs gives rise to another problem, namely excessive body rollout due to the centrifugal force acting on the vehicle spring mass in sharp turns. In such turns, the comparatively high centripetal acceleration $V^2/R$ of the sprung mass (vehicle velocity V, path radius R) requires large rollout spring deflections to make the sprung mass follow the path of the unsprung mass during the turn. Such large rollouts are undesirable because of passenger discomfort and because they can lead to loss of vehicle control.

The means used heretofore to reduce such vehicle rollout consist of either active powered systems or of passive restraints. In the active systems, pendulum-controlled hydraulic pumps deliver pressurized fluid to hydraulic actuators in a direction to oppose and counterbalance the overturning rollout moments. The hydraulic actuator reaction forces go directly to ground through the axles and wheels. In the system of passive restraints, comparatively stiff anti-roll torsion bars are used to bias either the front or rear pairs of wheels, or both. For example, a torsion bar extending from front wheel to front wheel is pivoted near its ends on the vehicle sprung mass (body or frame) on rubber grommeted bearings, and is joined to the axle and wheel assembly by a torque arm. This geometry retains the benefits of soft vehicle support springs for unsprung mass displacements when both wheels are displaced vertically the same amount. The torsion bar then simply rotates on its pivots, but has no twist torque. However, any tendency for vehicle roll, when one torque arm is displaced upwardly, while the other is displaced downwardly, results in torsion bar twist that resists the vehicle roll.

A disadvantage of the anti-roll torsion bar is that it nullifies the independent springing of all four wheels. For example, when the wheel at one end of the torsion bar is displaced by a pot-hole or raised obstacle, the resulting torsion bar twist transmits the wheel shock to the other corner of the vehicle. The torsion bar stiffness is thus added to the stiffness of the vehicle support springs and thereby increases the transmission of road shocks and vibrations to the vehicle body.

It is an object of my invention to eliminate vehicle rollout without the use of an active stabilizer system.

It is a further obJect of my invention to eliminate vehicle rollout completely without the use of a torsion anti-roll bar.

Still, another object of my invention is to provide truly independent springing at all four wheels with my passive anti-roll system and suspension geometry.

SUMMARY OF THE INVENTION

In accordance with the teachings of this invention, vehicle rollout on turns is completely eliminated by pivoting the vehicle sprung mass on an axis that lies in a plane that intersects the center of gravity of the sprung mass, with said plane being normal to the vertical plane of the side elevation of the vehicle. An important corollary of this criterion is that the centrifugal turn forces on the axis pivots must bypass the vehicle support springs and go directly to ground through the axles and wheels.

This anti-roll system is applicable to either front or rear wheel drive vehicles. The present disclosure describes a front wheel drive embodiment.

The axis plane, namely one that intersects the center of gravity of the sprung mass and is normal to a vertical plane of the side elevation of the vehicle, contains an infinite number of axes such that the centrifugal force in a turn will exert no rollout moment on any pivoted axis in this plane. In addition, there is an infinite number of such axis planes that intersect the cg. of the sprung mass. Out of this double infinity of axis choices, the final selection is quickly arrived at as the one that does not require any great change in the driving, steering and braking geometry from that of current vehicles and results in the simplest and most practical overall antiroll suspension. This is shown in the subsequent illustrations.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which.

DETAILED DESCRIPTION OF EMBODIMENTS

Figure 1:
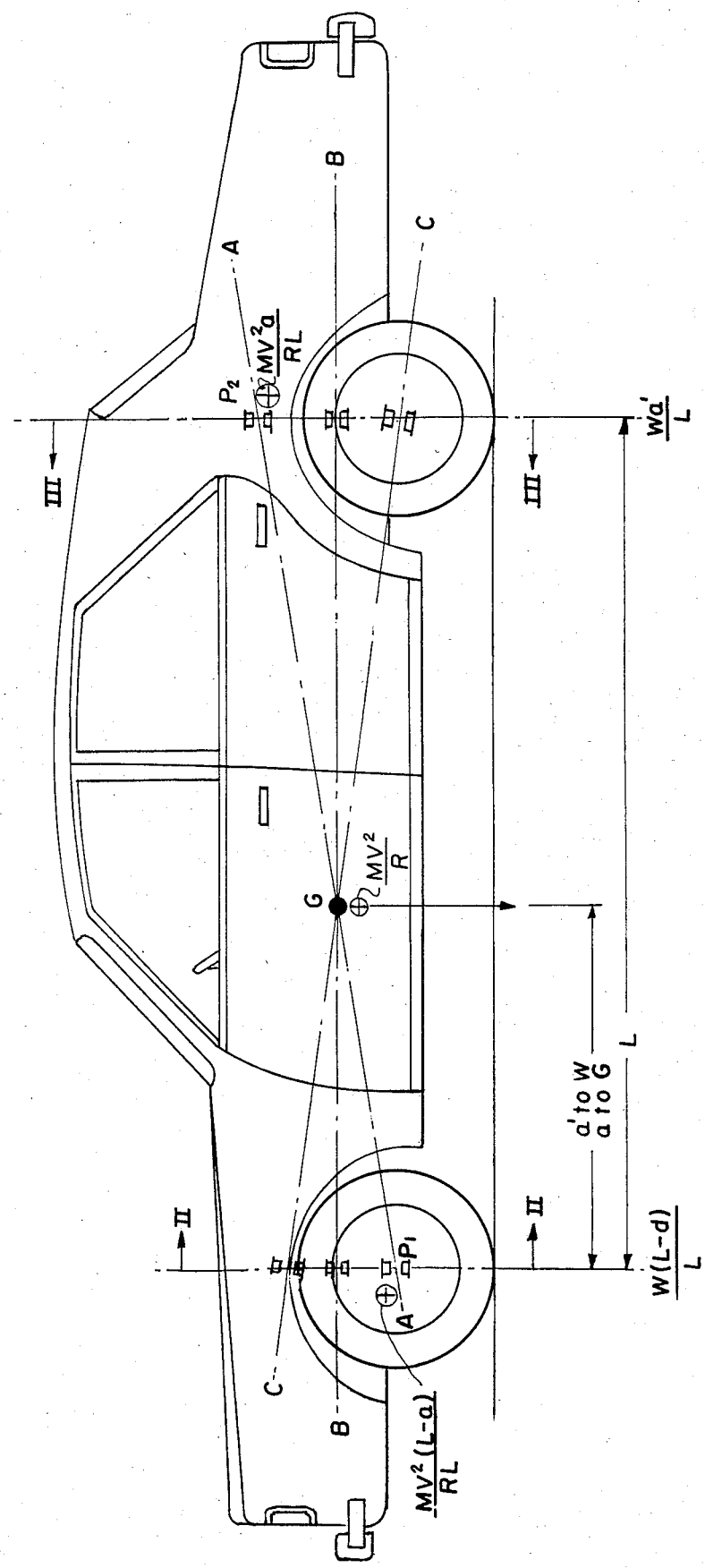
FIG. 1 is a view in side elevation showing a vehicle with the slanted anti-roll axis A—A lying in a plane passing through the center-of-gravity G of the sprung mass, and with the front axis pivot $P_1$ in a vertical plane through the front axles, whlle the rear axis pivot $P_2$ lies in a vertical plane through the rear axles. Also shown is the centrifugal force acting on G in a turn and its division into forces at the front and rear axis pivots $P_1$ and $P_2$. Since G is in the plane of the pivot axis A—A, the centrifugal force in this plane in a turn has no turning moment on the vehicle body and can produce no rollout.
Figure 2:
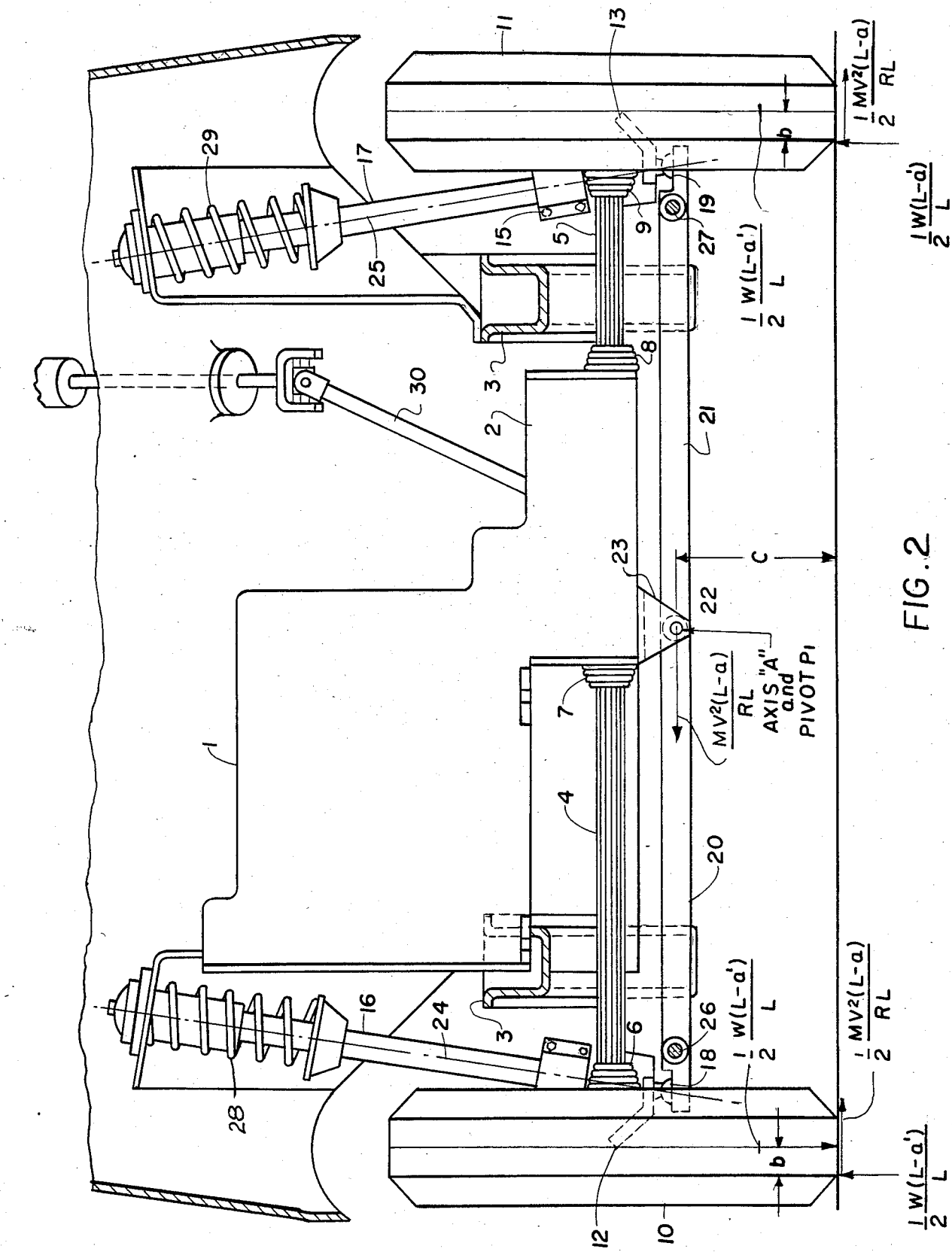
FIG. 2 is a view in front elevation showing the front pivot $P_1$ of the anti-roll axis mounted on the vehicle transaxle housing and connected to the wheel struts by single control arms which are attached to a ball joint on the steering knuckle on the MacPherson strut axis. Also shown, are the centrifugal force component on pivot $P_1$ and the equilibrating reaction forces at the vehicle wheels and ground. Pivot $P_1$ is preferably midway between the front wheels for symmetry in the wheel control bars.
Figure 3:
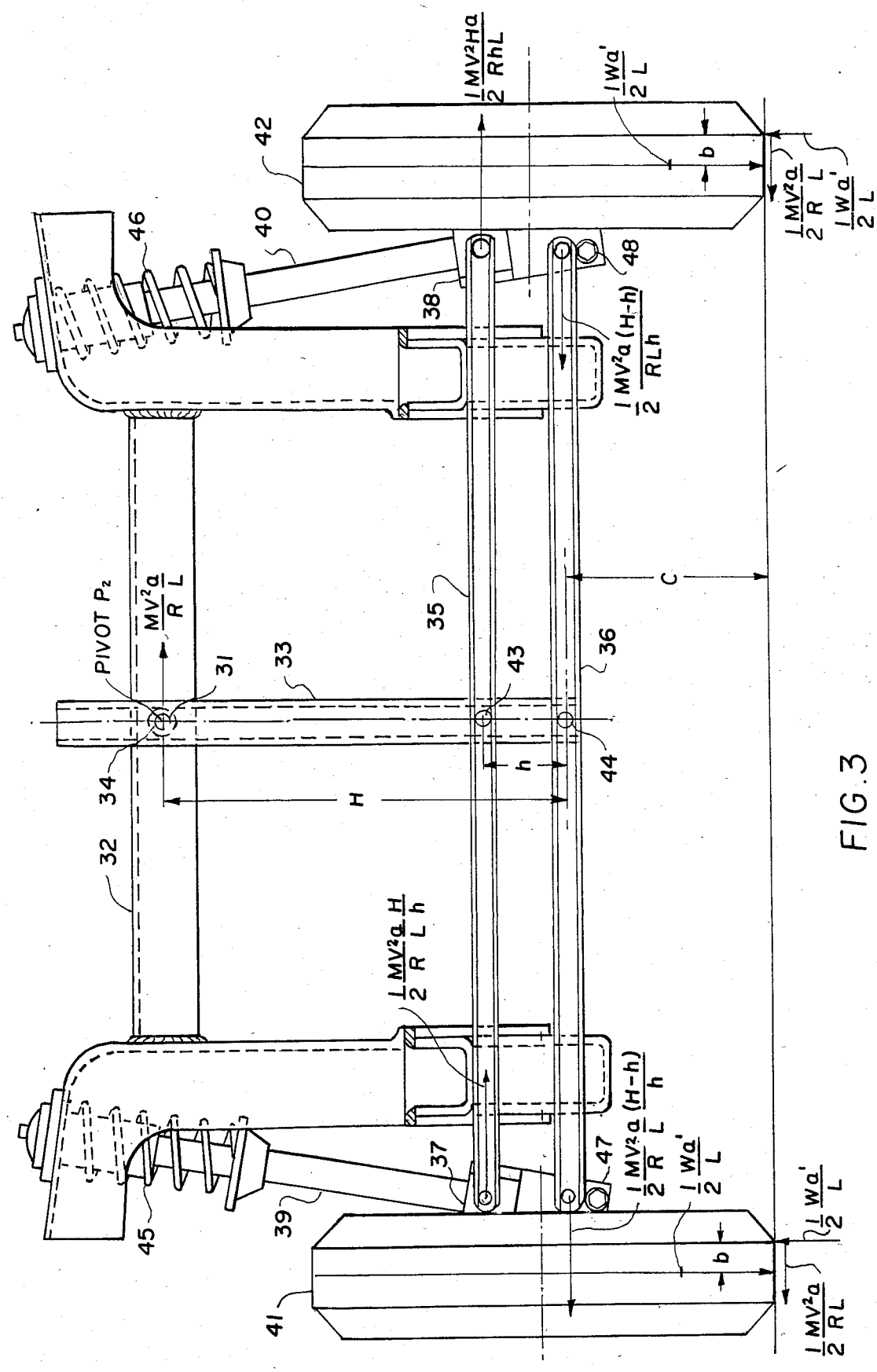
FIG. 3 is a view in rear elevation showing the rear pivot $P_2$ of the anti-roll axis A—A and the centrifugal force component acting on this pivot in a turn. The pivot $P_2$ is rigidly attached to a frame cross-member and supports a grommeted roller that engages a vertical channel member. The lower end of this channel is rotatably pinned to two horizontal bars that form a displaceable parallelogram with their pinned connections to the lower support body of the wheel struts. Also shown, are the equilibrating reaction forces at the vehicle wheels and ground. The vertical channel engaging pivot $P_2$ permits unimpeded vertical displacement of the rear wheels either singly or in unison with no loss of centrifugal force restraint. $P_2$ is also preferably in a vertical plane midway between the rear wheels.

The anti-roll suspension is shown in FIGS. 1 through 3 as applied to a front wheel driven passenger vehicle having a sprung mass M and a total vehicle weight W. In a turn, the centrifugal rollout force acts as if all of the sprung mass M were concentrated at its center-of-gravity G. This is located at a horizontal distance "a" from the front axle, while the center-of-gravity of the total vehicle weight W is located at a horizontal distance $a^1$ from the front axle. $a^1$ is usually somewhat greater than a. The resultant centrifugal force $MV^2/R$ on the sprung mass acts at G into the plane of the side elevation of FIG. 1 for a left turn, for example.

To prevent rollout, the sprung mass is suspended on an axis A—A which lies in a plane normal to the vertical plane of the side elevation, FIG. 1, and intersects the center-of-gravity G and the front axle at $P_1$. The prolongation of this plane from $P_1$ through G establishes the location of the rear pivot $P_2$ on a vertical line through the rear axle.

The resultant centrifugal force $MV^2/R$ at G is distributed between the two pivots, with $MV^2/R(L-a/L)$ going to the front pivot and $MV^2/R \, a/(L)$ going to the rear pivot, where L is the vehicle wheel base.

The exact location of G with respect to the pivot axis along the line of action of the resultant centrifugal force is not important from the point of view of rollout prevention. All locations of G along the line of action of the centrifugal force have zero rollout moments and the pivot axis since said line of action goes through the pivot axis. The mass distribution is usually such that G lies close to the longitudinal vertical plane of symmetry of the vehicle.

In a passenger vehicle, the mass of the passengers is part of the sprung mass and needs to be examined for its effect on rollout moments. The passenger mass can vary, for example, from that of a single 140 lb. driver to four or five 200 lb. individuals. In this regard, the slanted pivot axis through G has the advantage that the cg of the front seat passengers is at or close to the pivot axis while the cg of the rear passengers may even be slightly pendulous with respect to the pivot axis to produce a slight "roll-in", rather than a rollout. Also, the comparatively small passenger mass relative to the sprung vehicle mass make the passenger mass influence on rollout even less significant.

The front suspension geometry of a typical front wheel driven vehicle is shown in FIG. 2. The transversly mounted engine 1 and transmission plus differential 2 are supported on the vehicle frame 3. The drive axles 4, 5 projecting from the differential housing are connected by means of constant velocity universal joints 6, 7, 8, 9 to the front wheels 10, 11 through splines in the partially shown steering knuckles 12,13. The steering knuckles are part of the lower support members 14,15 of the suspension struts 16,17.

The sprung vehicle weight $Mg(L-a)/L$ is transmitted to the wheels and ground through support springs 28,29 through struts 16,17 and through the rigid connection of the steering knuckles to the wheel hubs. For lateral stability, the lower arms 12,13 of the steering knuckles are attached through ball joints 18,19 to control bars 20,21 that link the front wheel drive and steering assembly to the front pivot $P_1$ on the vehicle frame. Pivot $P_1$ is established by means of a pin 22 engaging a bracket 23 joined to the differential housing 2. Ball joints 18,19 are in line with the steering axes 24,25 of the wheel struts for unimpeded steering displacements of the front wheels. Longitudinal stability of the drive and steering assembly is provided by means of tie rods 26, 27 that extend from the wheel ends of control bars 20, 21 to the vehicle frame forward of the front axles. The ends of these tie rods are rubber grommeted to improve the geometry for vertical or lateral displacements of the wheels.

The component of the sprung mass centrifugal force acting on pivot $P_1$, namely $MV^2(L-a)/RL$, is transmitted via pin 22 to the lateral control bars 20,21 and thence to the wheel through the ball joints 18,19. The distribution of this force between these two bars is not uniquely determinable because of the lateral tire flexibility and because of the changeable friction forces between tires and road. One possible distribution is illustrated in FIG. 2. There, the centrifugal force $MV^2(L-a)/RL$ is equally divided between control bars 20,21. The result is that the control bar 20 force $\frac{1}{2}MV^2(L-a)/RL$ on the left wheel of the figure is equilibrated by an equal and opposite friction force acting between the wheel and ground. The overturning couple on the wheel due to the control bar force and its ground reaction is equilibrated by a counter couple $\frac{1}{2}W(L-a^1)b/L$ formed by the vehicle weight component and its ground reaction force at the tire that is displaced from the line of action of the weight force by some horizontal distance b.

Similarly, the control bar 21 force $\frac{1}{2}MV^2(L-a)/RL$ acting on the right wheel of the figure is equilibrated by an equal and opposite friction force acting between the wheel and ground. The overturning moment on the wheel due to the control bar force and its ground frictional reaction is also eqilibrated by a counter moment $\frac{1}{2}W(L-a^1)b/L$ due to the vehicle weight component and its ground reaction force at the tire which is displaced from the line of action of the weight force by some (not necessarily unique) distance b.

The other extrem from equal distribution of centrifugal forces on control bars 20,21 is for one bar to take the full force while the other is zero. This would merely necessitate a different value of b to equilibrate the overturning moment on the wheel.

Whatever is the distribution of the control bar forces, it seems clear that these forces can be equilibrated by tire and ground forces without involving unwanted deflections of the support springs 28,29.

Steering displacements of the wheels by the steering linkage 30 with either manual or power effort are also expected to have little or no effect on the equilibrium of forces analyzed in FIG. 2.

The rear suspension geometry of this front wheel driven vehicle is shown in FIG. 2. The problem to be solved there is to establish a pivot point $P_2$ that is considerably above the rear axles on slanted axis A—A and that permits vertical displacements of the rear wheels on their support springs without any significant change in wheel tread in spite of the elevated pivot. This is accomplished as follows:

Pivot $P_2$ is established by means of a pin 31 projecting from a frame cross-member 32 and in line with slanted axis A—A substantially halfway between the wheels.

Pin 31 engages a vertical channel member 33 by means of a roller 34 that is guided vertically by side flanges of said channel. The lower end of 33 is rotatably pinned to horizontal lateral control bars 35,36 whose ends are rotatably pinned to the clamp members 37,38 of the wheel struts 39,40. By "rotatably pinned", is meant a joint that allows the control bars 35,36 to be displaced angularly in a vertical plane by distortion of the bar 35,36 parallelogram when one wheel is displaced vertically more than the other wheel. This configuration also permits equal vertical displacements of both wheels 41,42 and control bars 35,36.

When one wheel is displaced vertically 5 in. for example, the vertical displacement of the channel member 33 is 2 ½in. With a length of bars 35,36 equal to 49 in., the bar angle is 5,857° and results in a horizontal displacement of 33 from a true vertical of 0.128 in. This small deviation can be accomodated by rubber-grommeting roller 34 and pins 43,44 connecting channel member 33 to lateral control bars 35,36 to prevent vertical displacements of one wheel relative to the other from being converted to horizontal disturbances on the vehicle sprung mass. The limited lateral flexibility of pivots 31,43 and 44 will have no effect on the anti-roll performance of axis A—A.

In FIG. 3, the sprung vehicle weight Mga/L, where g is acceleration of gravity, is transmitted to the wheels and ground through support springs 45,46, through struts 39,40 and through the rigid connection of strut clamping member 37,38 to the wheel hubs. Lateral stability of the wheels relative to the vehicle frame is provided by lateral control bars 35,36 in conjunction with vertical channel 33 and pivot $P_2$. Longitudinal stability of the rear suspension assembly is provided by means of tie rods 47,48 that extend from strut hubs 37,38 to the vehicle frame forward of the rear axles. The ends of these tie rods are rubber grommeted to improve the geometry for vertical or lateral displacements of the wheels.

The component of the sprung mass centrifugal force acting on pivot $P_2$, namely $MV^2a/RL$, is transmitted via pin 31 to roller 34 to channel 33 and thence to the wheels through bars 35,36 and strut hubs 37,38. The distribution of this force between these two bars is not uniquely determinable because of the lateral tire flexibility and because of the changeable friction forces between tires and road. One possible distribution is illustrated in FIG. 3. There, the force through pin 43 on upper control bar 35 is equally divided to a value $\frac{1}{2}MV^2aH/RLh$ acting on left hub 37 and an equal force on hub 38 at the right wheel. Similarly, the force on lower control bar 36 through pin 44 is divided to a value of $\frac{1}{2}MV^2a(H-h)/FLh$ acting on the lower end of hub 37 and an equal value on the lower end of hub 38. The overturning moment on the left wheel due to the control bar forces and their ground friction force is equilibrated by a counter moment $\frac{1}{2}Wa^1b/L$ formed by the vehicle weight component and its ground reaction force at the tire that is displaced from the line of action of the weight force by some horizontal distance b. The resultant force $\frac{1}{2}MV^2a/RL$ on the left wheel of the figure is equilibrated by an equal and opposite friction force acting between the wheel and ground.

The overturning moment on the right wheel due to the control bar forces and their ground reaction force is equilibrated by a counter moment $\frac{1}{2}Wa^1b/L$ due to the vehicle weight component and its ground reaction force at the tire which is displaced from the line of action of the weight force by some horizontal distance b. The resultant force $\frac{1}{2}MV^2a/RL$ acting on the right wheel of the figure is equilibrated by an equal and opposite friction force acting between the wheel and ground.

The other extreme from equal distribution of centrigual forces on control bars 35,36 is for one end of these bars to take the full force, while the other end is zero. This would merely necessitate a different value of b to equilibrate the overturning moment on the wheel.

Whatever is the distribution of the control bar forces at the rear wheels, it seems clear that these forces can be equilibrated by tire and ground forces without involving unwanted deflections of the support springs 45,46.

Thus the objects of this invention have been accomplished of:

1. Eliminating vehicle body rollout in sharp turns without hydraulic power actuators.
2. Eliminating vehicle body rollout in sharp turns without the use of stiff anti-roll torsion bars.
3. Permitting the use of softer body support springs with no adverse effect on body rollout in sharp turns.

While preferred embodiments of this invention have been disclosed herein, many modifications thereof are possible within the scope of the disclosed art. One such modification, for example, involves a roll axis B—B, as shown in FIG. 1, on a horizontal plane through the center-of-gravity of the sprung mass, with said plane parallel to the centrifugal force vector through said center-of-gravity. Other such possible axis planes through said center-of-gravity may be positioned at various intermediate angles between axes A—A and B—B.

Still another modification involves an axis C—C, as shown in FIG. 1, with said axis lying in a plane intersecting the center-of-gravity of the sprung mass, with said plane parallel to the centrifugal force vector through said center-of-gravity, and with said plane having an angular orientation clockwise with respect to axis B—B, as opposed to the counterclockwise orientation of axis A—A with respect to axis B—B.

This invention is not to be restricted except to the extent necessitated by the prior art.

I claim:

1. In a vehicle consisting of sprung and unsprung masses, the combination of struts and support springs for the weight of the sprung mass, an axis defined by pivots between sprung and unsprung masses, with a front pivot approximately midway between the wheels and near the vertical and horizontal planes through the front axles, with a rear pivot lying in an axis through the front pivot and in a plane through the center-of-gravity of the sprung mass, with said plane parallel to the centrifugal force vector through the center-of-gravity of the sprung mass, and with said rear pivot positioned approximately midway between the rear wheels, means for transmitting the centrifugal force component on the front pivot to the front wheels and ground, and means for transmitting the centrifugal force component on the rear pivot to the rear wheels and ground.

2. In the vehicle of claim 1, the means for transmitting the centrifugal force component on the front pivot to the front wheels and ground, with said means consisting of control bars oriented substantially parallel to the axles and rotatably joined to said front pivot pin, and with said control bars joined at their outer ends to the wheel steering knuckle assembly through a ball joint, with said control bars for right and left wheels being independently pivoted and joined, and with longitudinal tie rods between the vehicle frame and the outer ends of said control bars or wheel struts.

3. In the vehicle of claim 1, the means for transmitting the centrifugal force component on the rear pivot to the rear wheels and ground, with said means consisting of a pair of horizontal lateral control bars in a substantially vertical plane, with said control bars forming a distortable parallelogram with pinned joints at the strut clamping members at the wheels, a vertical channel member rotatably joined approximately to the midpoint of said control bars and extending upwardly to and guided by the rear pivot, with said rear pivot mounted on approximately the midpoint of a cross member of the vehicle frame and on the axis defined in claim 1.

4. In a vehicle consisting of sprung and unsprung masses, the combination of struts and support springs for the weight of the sprung mass, an axis defined by pivots between sprung and unsprung masses, with the pivots lying in a substantially horizontal plane intersecting the center-of-gravity of the sprung mass, with said plane parallel to the centrifugal force vector through the center-of-gravity of the sprung mass, with the front pivot lying in an approximately vertical plane intersecting the front axles, and with the rear pivot lying in an approximately vertical plane intersecting the rear axles, means for transmitting the centrifugal force component on the front pivot to the front wheels and ground, and means for transmitting the centrifugal force component on the rear pivot to the rear wheels and ground.

5. In a vehicle consisting of sprung and unsprung masses, the combination of struts and support springs for the weight of the sprung mass, an axis defined by pivots between sprung and unsprung masses, with the pivots lying in a plane intersecting the center-of-gravity of the sprung mass, with said plane orientation inclined clockwise from a horizontal orientation, and with said plane parallel to the centrifugal force vector through the center-of-gravity of the sprung mass, with the front pivot lying in an approximately vertical plane intersecting the front axles, and with the rear pivot lying in an approximately vertical plane intersecting the front axles, and with the rear pivot lying in an approximately vertical plane intersecting the rear axles, means for transmitting the centrifugal force component on the front pivot to the front wheels and ground, and means for transmitting the centrifugal force component on the rear pivot to the rear wheels and ground.

6. In a vehicle consisting of sprung and unsprung masses, the combination of struts and support springs for the weight of the sprung mass, an axis defined by pivots between sprung and unsprung masses, with the pivots lying in a plane intersecting the center-of-gravity of the sprung mass, with said plane orientation inclined counterclockwise from a horizontal orientation, and with said plane parallel to the centrifugal force vector through the center-of-gravity of the sprung mass, with the front pivot lying in an approximately vertical plane intersecting the front axles, and with the rear pivot lying in an approximately vertical plane intersecting the rear axles, means for transmitting the centrifugal force component on the front pivot to the front wheels and ground, and means for transmitting the centrifugal force component on the rear pivot to the rear wheel and ground.

* * * * *